M. G. FARMER.

Improvement in Insulators.

No. 124,200.            Patented March 5, 1872.

Witnesses.
F. W. Howard
E. R. Stansbury.

Inventor.
Moses G. Farmer
By his Attorney
Chas. F. Stansbury 124,200

UNITED STATES PATENT OFFICE.

MOSES G. FARMER, OF SALEM, MASSACHUSETTS.

IMPROVEMENT IN TELEGRAPH-INSULATORS.

Specification forming part of Letters Patent No. 124,200, dated March 5, 1872.

SPECIFICATION.

*To all whom it may concern:*

Be it known that I, MOSES G. FARMER, of Salem, in the county of Essex and State of Massachusetts, have invented a new and useful Improvement in Insulators for Telegraph-Wires; and I do hereby declare the following to be a full and correct description of the same, reference being had to the accompanying drawing, in which—

Figure 1:
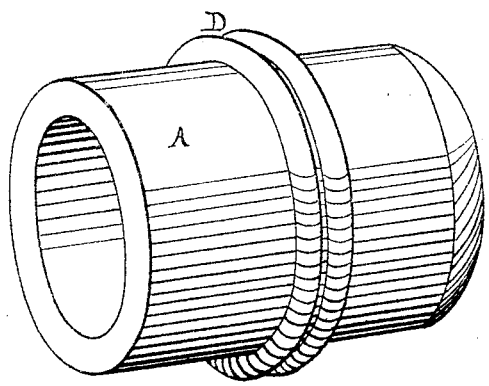
Figure 2:
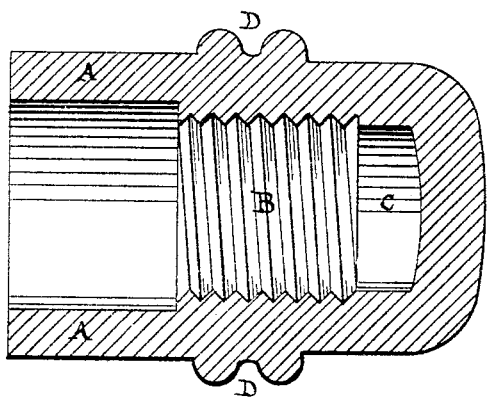

Figure 1 is a perspective view of my device, and Fig. 2 is a central vertical section of the same.

Heretofore insulators have been made of glass, porcelain, and composite substances, many of which possess merit, although liable to some important objections. Glass does not resist sufficiently the wear to which it is subjected; porcelain is open to the same objection, and to that of high cost, besides not being sufficiently strong. The "Brooks insulator," a representative of the composite class, being made of glass, coated with paraffine, and inclosed in a metal cap, is nearly perfect, but it is liable to crack; the cap prevents the ready discovery of the defects, and the cost is so great as to be an obstacle to its general introduction.

The object of my invention is to combine whatever excellencies these insulators possess, and to produce one which shall be strong, resist the effects of the weather, perfectly insulate the wires, while it can be manufactured at so moderate a cost as to allow of its ready adoption. It consists of an insulator, made preferably in the form shown in the drawing, and composed of biscuit-ware or other plastic and porous material, molded in the desired shape with a screw-thread formed in its interior surface, and a groove on its exterior for the reception of the wire. Thus made, it is dried, baked, and glazed, and afterwards immersed in a composition described in an application of even date herewith, and raised to a high heat, whence it is removed and placed in heated petroleum, from which it is taken and is ready for the market.

Referring to the drawing, A may represent an insulator of any approved form, made of biscuit or earthen-ware, or other suitable porous and plastic material, provided with a screw-thread, B, on its interior surface, and a groove, D, on its exterior surface, said groove being formed by two beads. A space, c, is left between the end of the insulator, and its thread to allow of its adjustment on the pin or bracket, as this may become necessary.

The mode of manufacture is as follows: The material used is molded in a suitable flask, or by hand on a pattern-wheel, the thread being formed by a wooden screw-plug, which is kept in the insulator until it is sufficiently hard to sustain its own weight, when it is withdrawn and the device is then dried, baked, and glazed in any ordinary manner. After it is glazed it is immersed in a melted composition of rosin, bees-wax, spermaceti, and oil, more or less of the oil being added, according to the climate in which the insulators are to be used, for which composition application has been made for Letters Patent, even date with this. This composition is heated to from 250° to 350° Fahrenheit, or so long as bubbles escape, care being taken not to injure the mixture or composition by too great heat. When the bubbles cease to rise the insulators are removed and placed in another vessel containing heated petroleum, "Merrill's deodorized oil" being considered the best by me. The porous material absorbs the mixture, which serves when hard to close the pores, and thus exclude moisture and preserve the insulating properties of the device. The oil removes any of the mixture that remains on the surface, but leaves the insulator sufficiently unctuous to shed the rain and to prevent the deposit of a film of moisture, which has been found so prejudicial to glass and other insulators having a vitreous surface. They are allowed to remain in the oil a short time, when they are removed and are ready for the market.

It will be found that these insulators can be manufactured at a small cost, and will insulate perfectly, wear well, and be adapted to all climates.

Having thus fully described my invention, what I claim, and desire to secure by Letters Patent, is—

A telegraphic insulator composed of earthen, stone, or biscuit-ware, or other suitable or porous and plastic material, molded, threaded, and prepared, substantially in the form and manner described, and saturated with the insulating compound specified, or other suitable insulating mixture, for the purposes set forth.

The above specification of my said invention, signed and witnessed at Boston this 18th day of August, A. D. 1871.

MOSES G. FARMER.

Witnesses:
CHARLES STOWELL,
GEO. A. STOWELL.